US009092858B2

(12) United States Patent
Simske et al.

(10) Patent No.: US 9,092,858 B2
(45) Date of Patent: Jul. 28, 2015

(54) METHOD AND SYSTEM FOR DETERMINING VOID PANTOGRAPH SETTINGS

(75) Inventors: Steven J. Simske, Fort Collins, CO (US); Jason S. Aronoff, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/810,694

(22) PCT Filed: Dec. 16, 2010

(86) PCT No.: PCT/US2010/060887
§ 371 (c)(1),
(2), (4) Date: Jan. 17, 2013

(87) PCT Pub. No.: WO2012/082132
PCT Pub. Date: Jun. 21, 2012

(65) Prior Publication Data
US 2013/0251191 A1    Sep. 26, 2013

(51) Int. Cl.
*G03G 21/04*    (2006.01)
*H04N 1/00*    (2006.01)
*G06T 1/00*    (2006.01)

(52) U.S. Cl.
CPC ............ *G06T 1/0021* (2013.01); *G03G 21/043* (2013.01); *H04N 1/00883* (2013.01); *B42D 2035/26* (2013.01)

(58) Field of Classification Search
CPC .. G06T 2201/0064; B41M 3/14; B41M 3/146
USPC .......................... 382/100, 112, 165, 169, 229
See application file for complete search history.

(56) References Cited

U.S. PATENT DOCUMENTS 6,005,582 A * 12/1999 Gabriel et al. ................ 345/586
6,209,923 B1    4/2001 Thaxton et al.
6,394,358 B1    5/2002 Thaxton et al.
(Continued)

FOREIGN PATENT DOCUMENTS

WO    WO-2010/098759 A1    9/2010
WO    WO-2010/098760 A1    9/2010

OTHER PUBLICATIONS

Balasubramanian, Raja et al, "Reducing Muilti-Separation color Moire by a Variable Undercolor Removal and Gray Component Replacement Strategy", Mar./Apr. 2001.

*Primary Examiner* — Amir Alavi
*Assistant Examiner* — Kenny Cese
(74) *Attorney, Agent, or Firm* — Pearl, Cohen, Zedek, Latzer LLP

(57) ABSTRACT

A method and system for determining void pantograph settings is presented. The method includes obtaining electronic images of one or more predefined test sheets having a plurality of void pantograph settings, modeling one or more regions of the electronic images, predicting the sensitivity of the plurality of void pantograph settings to a print/scan process, the predicting being based at least in part on the one or modeled regions, and identifying characteristics for a candidate void pantograph setting using the prediction step results. The system includes a controller, a modeling unit, a measuring unit and a prediction unit configured to perform a method in accordance with an embodiment of the invention. A computer readable medium containing executable instructions is also described.

15 Claims, 8 Drawing Sheets

(56) References Cited

U.S. PATENT DOCUMENTS

| | | |
|---|---|---|
| 7,384,890 B2 | 6/2008 | Lubrino et al. |
| 2007/0133059 A1 | 6/2007 | Hu |
| 2008/0301767 A1* | 12/2008 | Picard et al. .................... 726/2 |
| 2009/0207433 A1 | 8/2009 | Wang et al. |
| 2010/0123912 A1 | 5/2010 | Wang et al. |
| 2010/0150433 A1* | 6/2010 | Wang et al. .................. 382/162 |

* cited by examiner

METHOD AND SYSTEM FOR DETERMINING VOID PANTOGRAPH SETTINGS

BACKGROUND

A void pantograph may be printed as part of a document. A void pantograph may help to make the document hard to duplicate, forge, and/or alter. The void pantograph may have the word "VOID" or "COPY" as a hidden element by the use of special screens and/or background designs. When reproduced, the hidden element appears on the copied document.

Some prominent examples of void pantographs are those that are used as backgrounds for checks, which, for example, display "VOID" or "COPY" on the reproduced image. Void pantographs may be used for packaging, labels, documents, or the like. In general, pantograph approaches may be used to hide in plain sight a variety of other information that can be read and acted upon.

DETAILED DESCRIPTION

A document in accordance with an embodiment of the invention may include a modular, multi-layer architecture definition of a void pantograph that includes a void pantograph background pattern and a void pantograph highlight pattern. The graphical alignment of the overt document foreground content with the prior-to-photo-imaging covert void pantograph background content may be optimized for the combination of document and void pantograph content in accordance with an embodiment of the invention.

Figure 1:
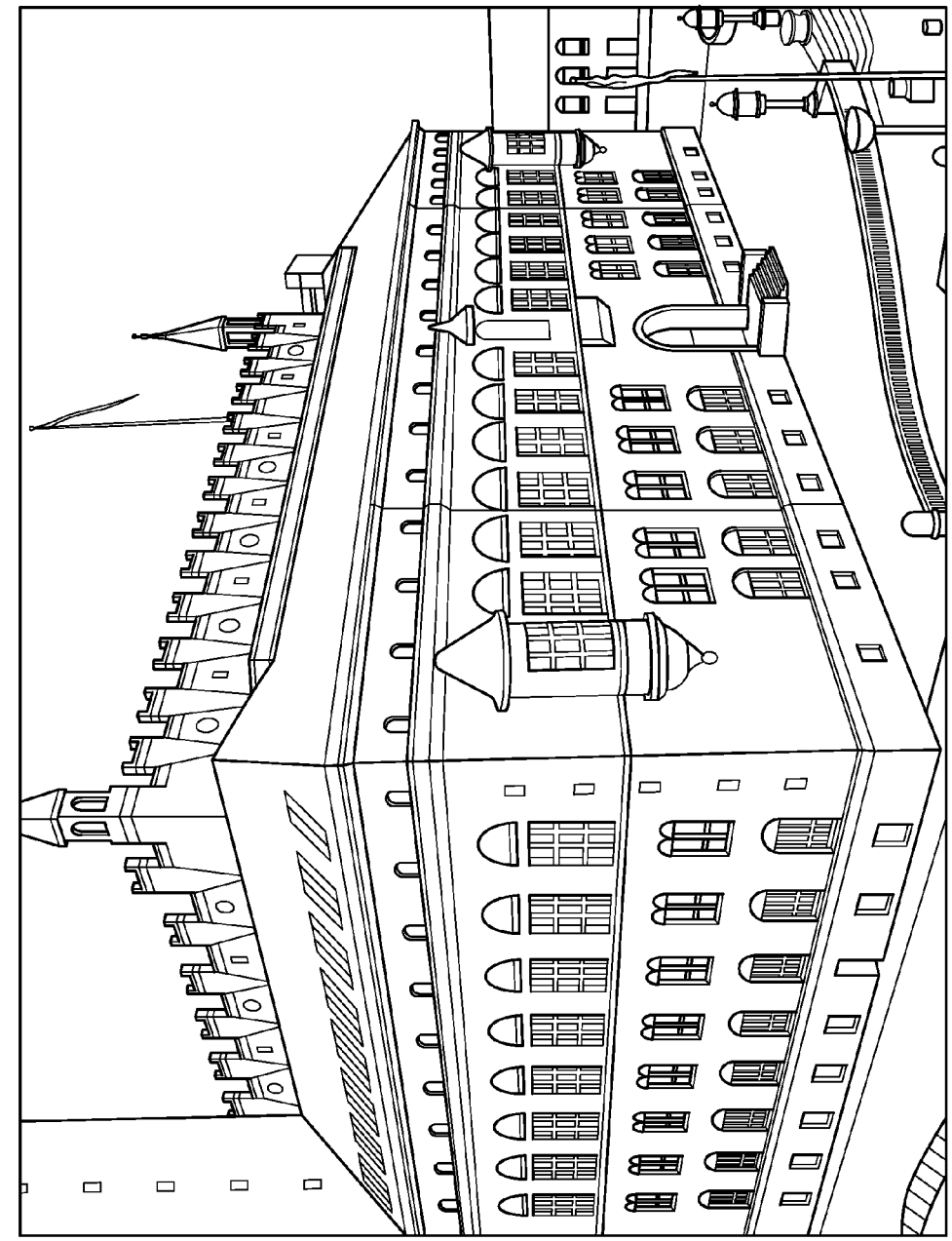
FIG. 1 is a schematic representation of an image.

FIG. 1 schematically represents a non-limiting example of image 10 from which a void pantograph may be generated. Image 10 may be any digitized image, including an image captured with a digital camera, camcorder, or scanner. The image may also be produced by imaging software, graphics software, or the like. The image may be any desirable image—e.g., text, shapes, glyphs, embedded information to initiate, instantiate, continue, complete, etc. workflow(s), security applications, or other information that can be read and interpreted. The image may be custom designed using a company's name or logo.

Image 10 may be filtered using one or more filters. Non-limiting examples of such filters include an edge filter (e.g., Sobel operator, Canny operator, Laplace operator, neighborhood variance, gradient, etc.), a color filter, a hue filter, a chroma filter, a saturation filter, a brightness filter, an intensity filter, a luminance filter, a texture filter, a local entropy filter, a graininess filter, a specific shape filter, a threshold filter (Otsu adaptive method, etc.), a sharpness filter, a convolution filter, and/or other imaging filters. One or multiple filters may be selected to filter image 10.

Figure 2:
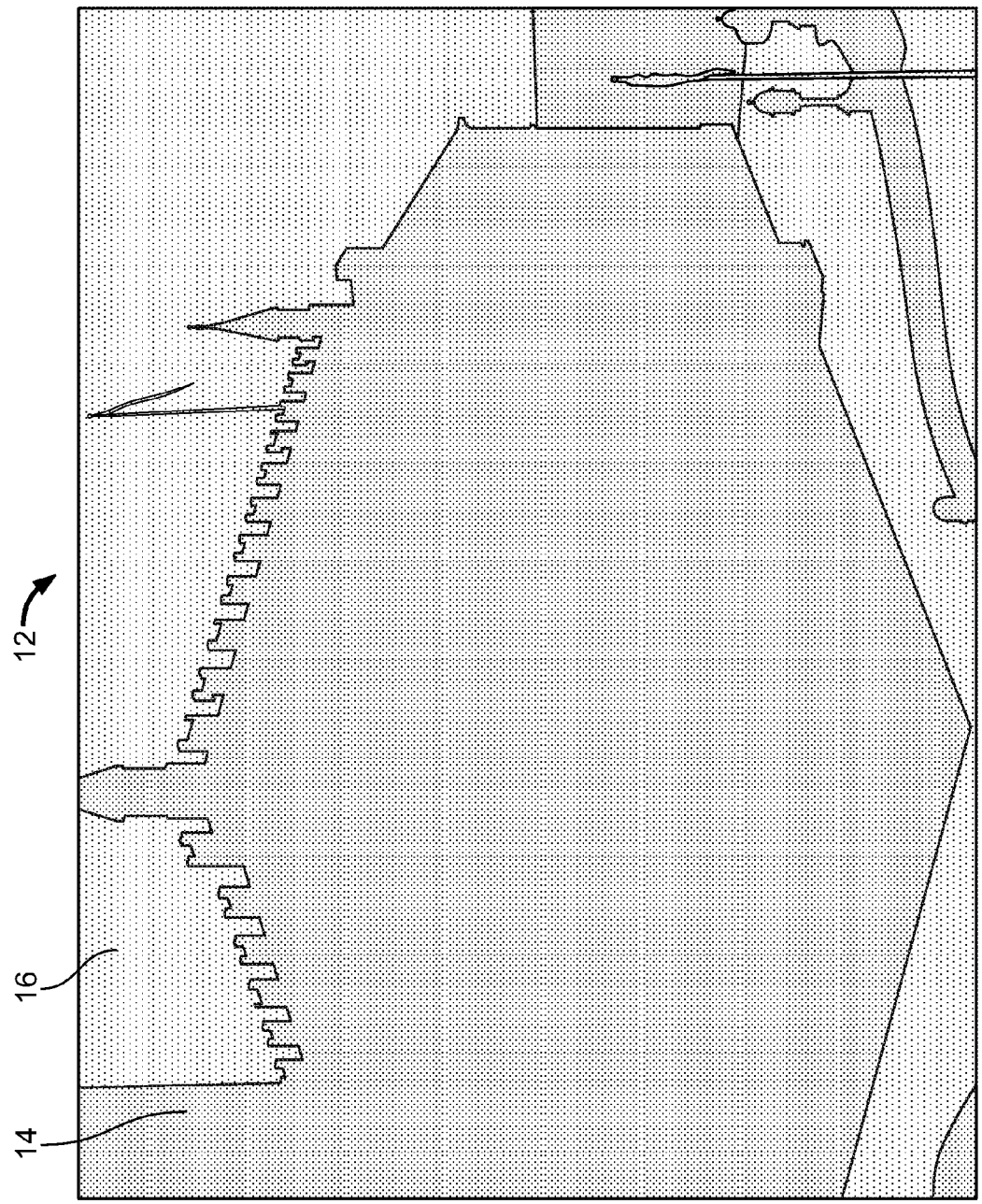
FIG. 2 depicts a photocopy of a void pantograph formed from the image of FIG. 1.

FIG. 2 depicts a photocopy of void pantograph 12 (a void pantograph may be virtually invisible after printing, but highly detectable after photocopying the printed document). The filter(s) may designate one or more areas for a pantograph background pattern 14 and a pantograph highlight pattern 16 based upon the particular attribute associated with the filter. For example, if an edge filter is selected to filter image 10, the filtering process may identify edge pixels and non-edge pixels. The filtered pixels may then be assigned to the pantograph's background pattern 14 or highlight pattern 16, depending, at least in part, on which pixels are suitable for forming the respective regions of the void pantograph. In the example involving an edge filter, the edge pixels may be assigned to the pantograph background pattern 14, and the non-edge pixels may be assigned to the pantograph highlight pattern 16.

As used herein, the phrase "pantograph background pattern" refers to the portion of the void pantograph that may be covert or semi-covert after being printed on an object, but that becomes patent or overt after the printed region of the object is scanned and/or photocopied. In other words, the pantograph background pattern 14 may be visible to the human eye (perhaps upon close inspection) after printing and may be virtually indistinguishable from both the pantograph highlight pattern 16 and the object foreground (not shown) after printing. Also as used herein, the phrase "pantograph highlight pattern" refers to the portion of the void pantograph that may be covert, or semi-covert after being printed on an object). When printed, a void pantograph highlight pattern and a void pantograph background pattern may (and properly should) look the same, and so their relative coverage of the printed area may be obfuscated. After printing the second time (i.e., photocopying the original printed document), the highlight pattern and the background pattern may (and properly should) differentially stand out from one another.

In accordance with an embodiment of the invention, areas of image 10 may be identified as being suitable for the pantograph background pattern 14 or pantograph highlight pattern 16. Characteristics of background pattern 14 and/or highlight pattern 16 may be systematically manipulated, altered, etc. in order to generate a test sheet. Examples of such characteristics include pixel size, shape, orientation, color distribution, spacing pattern, "coverage" or mean grayscale intensity, or combinations thereof, etc. In one implementation, suitable areas of image 10 may be identified independently (e.g., before or after) of determining the void pantograph characteristics.

Figure 3:
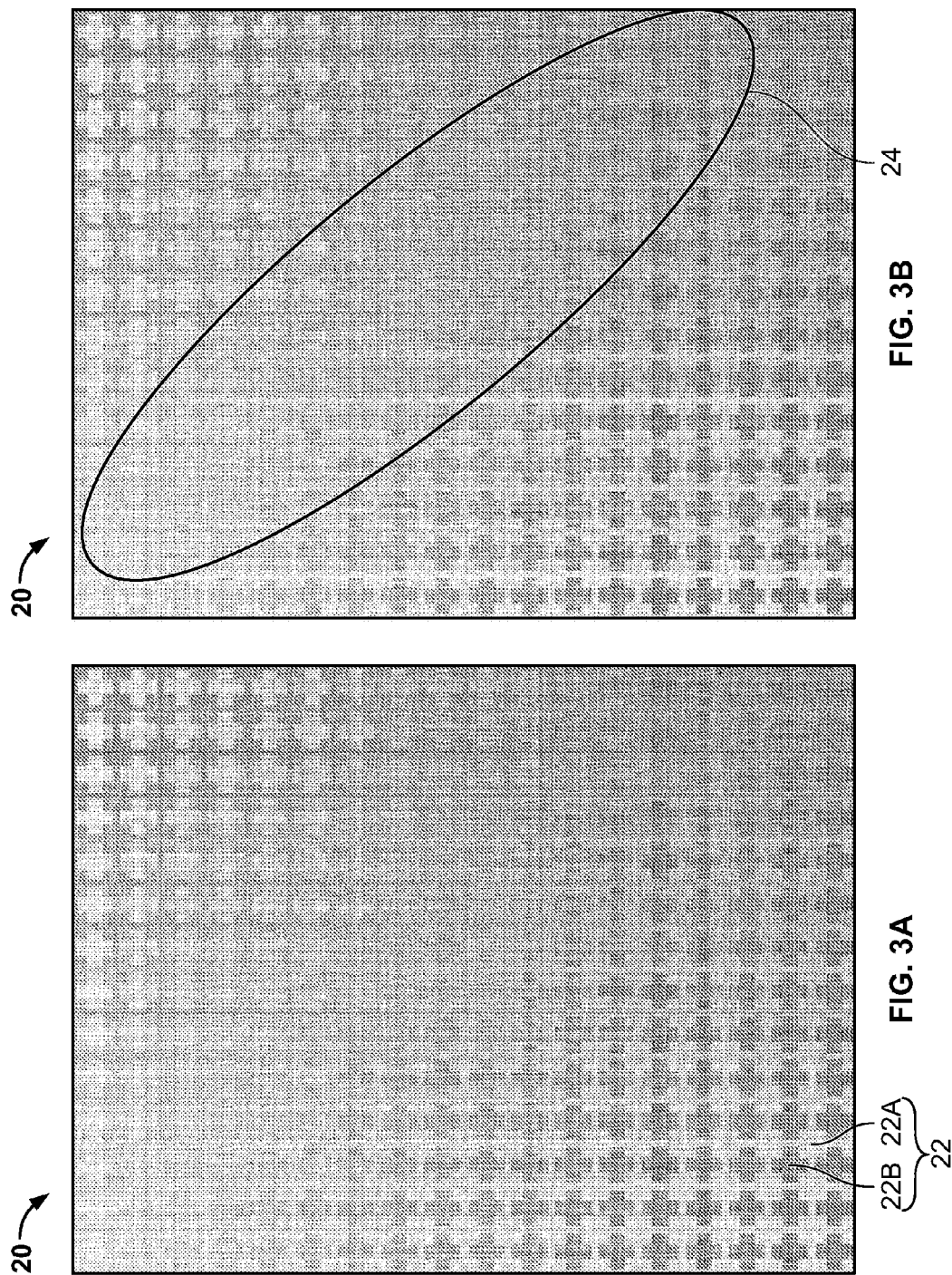
FIGS. 3A-B depict a computer-generated test sheet having multiple test pantographs in accordance with an embodiment of the invention.

FIGS. 3A-3B depict computer-generated, printed test sheet 20 having multiple test pantographs in accordance with an embodiment of the invention. As mentioned above, the pantograph image may be any desirable image. Test sheet 20 may include variations in test pantograph 22, which itself may include, for example, a square background pattern 22A and a cross highlight pattern 22B. Many other shapes and/or combinations of shapes may also be used, including, for example, shapes that may be readable by machine, human, or both. The square background pattern may be printed from many individual pixels forming collectively one shape (e.g., a dot, square, oval, etc.) and the cross highlight pattern may be printed from many individual pixels forming collectively another shape. The shape of the individual pixels used to form background pattern 22A and highlight pattern 22B may or may not be the same shape. In some implementations, the background and highlight patterns may be the same shape if an aggregate of shapes are used together as a void pantograph itself, or if a non-uniform press (i.e., a printing press having different characteristics in x and y directions) is used.

Test pantograph 22 is repeated along rows and columns of test sheet 20. Each test pantograph 22 may be different from the next test pantograph by a variation in the individual pixel density of either foreground 22A and/or background 22B. This variation in pixel density may be accomplished by incrementing the percentage of "coverage" (e.g., density—percentage of black pixels printed) over the test page, and may be expressed as a percentage of the amount of pixel fill over the total amount of area for the respective background pattern or highlight pattern shape. Rows of test sheet 20 may have an increase in the pixel density for the background pattern 22A, and columns of test sheet 20 may have an increase in the pixel density for the highlight pattern 22B. In one implementation, the incremented variable may be reversed between row and column.

In generating test sheet 20, any desirable characteristic may be selected to remain static while other characteristics are varied. For example, various background patterns may be tested against various highlight patterns; a desirable background pattern setting may be selected and then set, then the highlight pattern characteristics may be altered to generate the test sheet. The test pantographs are used to experiment with different characteristics in order to determine the best characteristics for deployment of the void pantograph.

From the set of suitable background/highlight pattern candidates, final deployment settings may be determined by using the combination(s) that provide the best visible results after copying. The best settings may be those where test pantograph 22 is least visible after printing but most visible after photo-imaging (e.g., scanning or photocopying). In particular, those test pantographs with background patterns 22A that are not visible and/or distinguishable after printing or photo-imaging may have the best settings. In one implementation, the best background patterns may have as a necessary but not sufficient condition that they are not visible after initial printing, but must also be in the highly visible group after photocopying. For example, if P is the group visible after printing and C is the group visible after copying, the best candidates are members of $\overline{P} \cap C$.

FIG. 3B depicts printed test sheet 20 with the set of potential candidate void pantograph settings. These potential candidate void pantograph settings are outlined within area 24. Area 24 may appear anywhere on test sheet 20 based on how the characteristics of test pantograph 22 is varied. Area 24 may also be non-contiguous based on the test pantograph characteristic variation. Within area 24 test pantograph 22 may be least visible, while inspection of the variations of test pantograph 22 outside ellipse 24 may reveal that one, or both, of background pattern 22A and highlight pattern 22b may be more pronounced than the variations within area 24. The ideal test pantograph is one where the background pattern and highlight pattern blend together resulting in a test pantograph that may be visually indistinguishable when printed, but highly distinguishable when photocopied.

Once the settings for the void pantograph are obtained, a multi-layer approach to producing a printed item having the void pantograph may be implemented.

Figure 4:
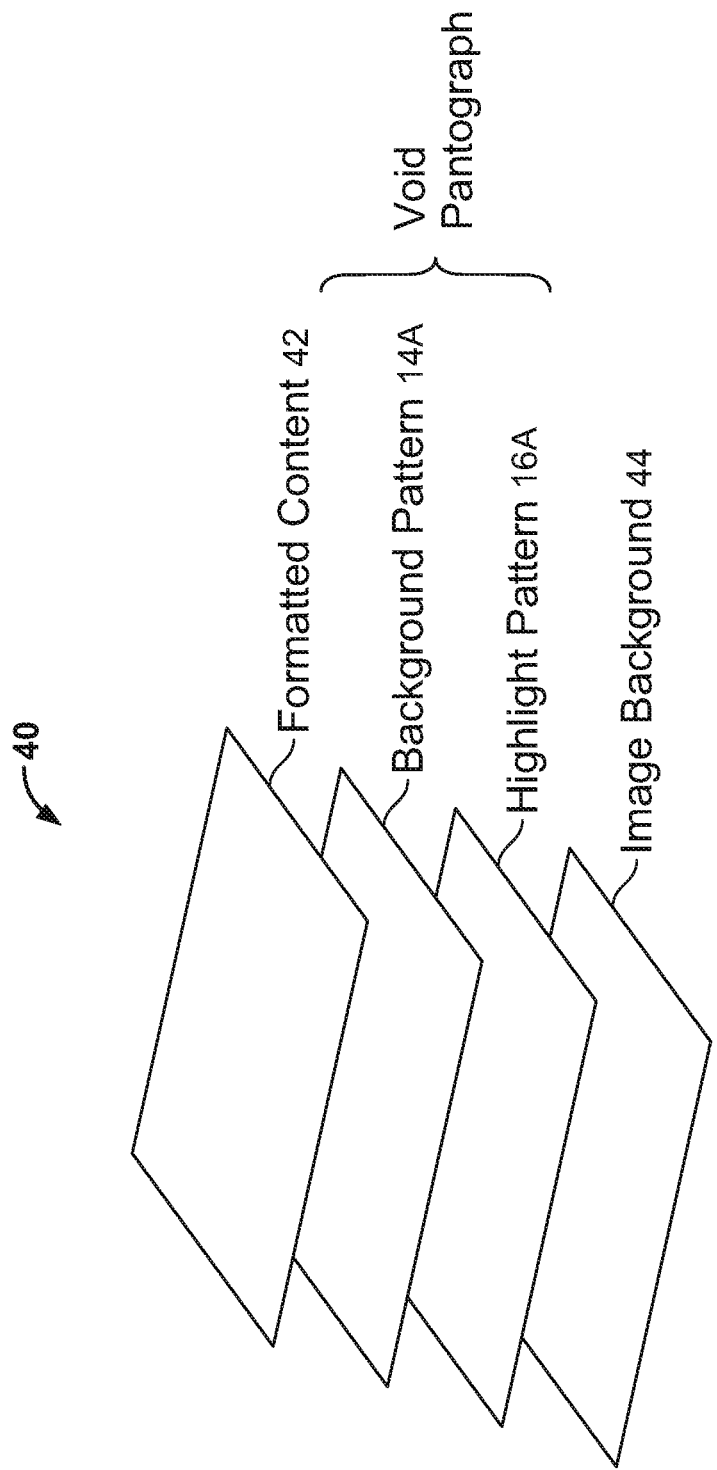
FIG. 4 depicts a document having a multi-layer void pantograph architecture in accordance with an embodiment of the invention.

FIG. 4 depicts document 40 that may be printed with a layered void pantograph architecture in accordance with an embodiment of the invention. The void pantograph architecture may include a four-layer approach in accordance with an embodiment of the invention. Document 40 having a layered void pantograph architecture may include document formatted content 42, void pantograph background pattern 14A, void pantograph highlight pattern 16A, and image background 44. The image background may be a uniform color. Document formatted content 42 may include information (e.g., branding, aesthetics, product information, etc.).

Document formatted content 42 is above void pantograph background pattern 14A, which is above void pantograph highlight pattern 16A, which is above image background 44 thus creating a flattened image that has precedence, e.g., order, among its layers. This precedence may imply that document formatted content 42, void pantograph background pattern 14A, and void pantograph highlight pattern 16A may be logical masks tied to content—e.g., the content of each successively higher layer overwrites or masks the layer(s) beneath that content.

Figure 5:
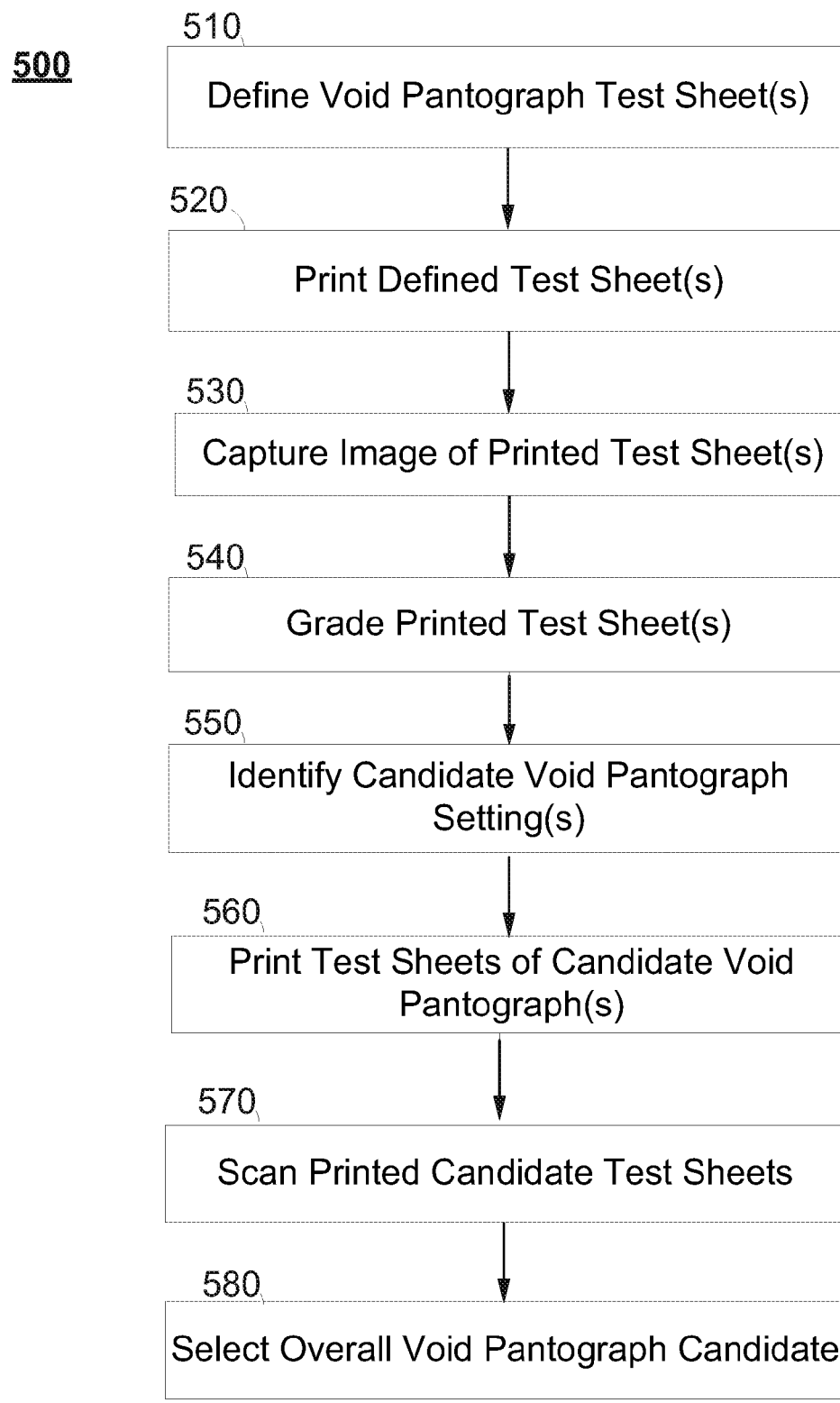
FIG. 5 depicts a process in accordance with an embodiment of the invention.

FIG. 5 illustrates process 500 for semiautomatic selection of a void pantograph in accordance with an embodiment of the invention. Process 500 may begin with defining an appropriate test sheet(s), step 510. These test sheets may be defined so as to exercise a robust range of void pantograph characteristics as described above (e.g., pixel size, shape, orientation, color, distribution, spacing pattern, "coverage" or mean grayscale intensity, or combinations thereof, etc.) for the printer(s) to be used to print the document having the void pantograph.

All defined test sheets may be printed, step 520. Because photocopying and/or scanning the printed test sheets may reveal the void pantographs, a non-xerographic imaging device may be used to capture, step 530, the images of the printed test sheets. Experimental results indicate that a digital camera or inspection camera may serve this purpose. In an implementation, other visual imaging devices may be used as well. For example, a super high-resolution scanner may also work, but performance may suffer due to the processing time associated with the large image file. While normal copying leads to the described void pantograph effects, higher resolution capture may not affect the dots and lower resolution scanning such as with digital cameras may not elicit the differential effects on the dot patterns due to differences in blurring, contrast, etc.

The captured test sheet image(s) may be graded, step 540. The grading operation may evaluate the printed test sheets for low contrast regions which may be more amenable to producing a successful void pantograph—e.g., regions where the void pantograph highlight pattern (e.g., crosses 22B in FIG. 3) are the least different from the void pantograph background pattern (e.g., squares 22A in FIG. 3) in terms of mean gray level, histogram comparison, and other measures of relative contrast.

Candidate void pantograph settings are identified, step 550. The settings may be identified manually. However, in one implementation, if the printer type is known a set of test prints can be run. Even if the printer type is unknown, a "shotgun" approach can be taken where a large set is tested and then honed in to a smaller, more focused (less broad coverage of the range of settings) set of test prints—resulting in a semi-automatic approach to identification. Candidate void pantograph setting(s) may have the lowest-contrast regions (using a threshold ($Th_1$) based on historical/empirical testing). To identify the best candidates which are members of $\overline{P} \cap C$, it is generally straightforward to find P and then $\overline{P}$, then C and $\overline{C}$. The threshold can be set from human observation—i.e. from human perceptive results discriminating when a void pantograph is visible and when not.

Test sheets having the candidate void pantograph(s) may be printed, step 560. These test sheets may then be scanned, step 570. Scanning may reveal the void pantograph's payload—e.g., void pantograph background. The best overall void pantograph setting may be selected, step 580. A best candidate may be selected based on having a high contrast between the formatted document content and the void pantograph background.

The best overall void pantograph candidate setting may meet the following criteria:

(a) Contrast ($C_1$) after printing is less than threshold $Th_1$ ($C_1<Th_1$), where ti is the threshold for highest acceptable contrast after printing (void pantograph doesn't show—usually or initially based on human factors engineering—i.e. human testing and feedback);

(b) Contrast $C_2$ after copying is greater than threshold $Th_2$ ($C_2>Th_2$), where $Th_2$ is the threshold for minimal acceptable contrast after copying (e.g., the void pantograph background is visible); and (c) For all candidates meeting the conditions of criteria (a) and (b), the selected void pantograph setting(s) have the greatest ratio (R) of contrast after copying to contrast after printing—e.g., $R=C_2/C_1$. The contrast is based on mean grayscale values between foreground and background, and so is non-arbitrary. The overall R may be automated once the foreground and background patterns are registered in the scanned image (which is readily done since it is a test sheet).

Figure 6A:
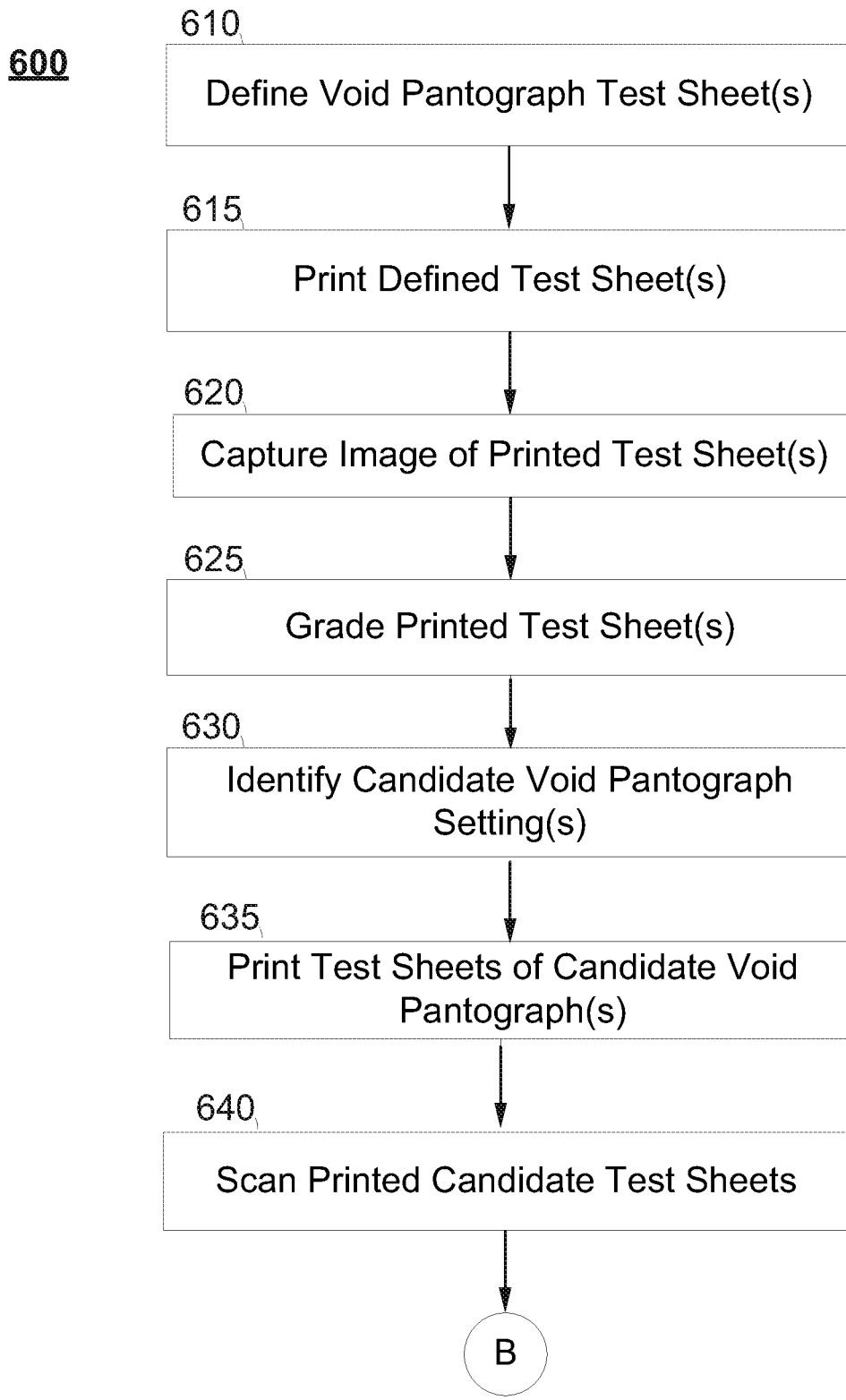
FIGS. 6A-6B depict a process in accordance with an embodiment of the invention.
Figure 6B:
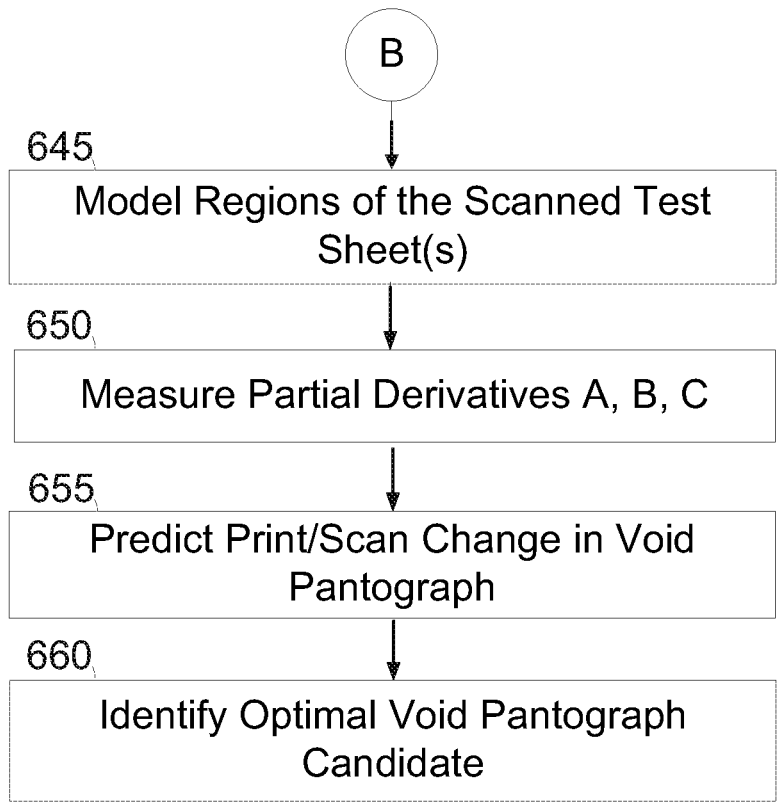

FIG. 6 illustrates process 600 for automatic selection of void pantograph settings in accordance with an embodiment of the invention. Process 600 may begin with steps 610-640, which are similar in nature to steps 510-570, described above for process 500.

In accordance with an embodiment of the invention, appropriate test sheet(s) may be defined, step 610. The defined test sheets may be printed, step 615. An image of the printed tests sheet(s) may be captured, step 620. The captured image(s) may be graded, step 625. By grading the captured images, candidate void pantograph setting(s) may be identified, step 630. Test sheets of the identified candidate void pantograph setting(s) may be printed, step 635. These printed test sheets may then be scanned, step 640.

Process 600 may continue by modeling regions of the candidate test sheets, step 645 into three dimensions:

1, Percent background (B)—e.g., gray level coverage of the void pantograph highlight pattern;

2. Percent foreground (F)—e.g., gray level coverage of the void pantograph background pattern; and 3. Different shape representations (S). Shape representations may be the different shapes used for the dot patterns within the void pantograph effect—e.g. rectangles, squares, ellipses, etc. There is in general a variability of the void pantograph effect depending on the shape of the printed dots, or marks.

The current state of the void pantograph candidates (VP) in terms of their percent background (B), percent foreground (F), and shape representations (S) may be expressed as:

$$VP = \begin{bmatrix} B \\ F \\ S \end{bmatrix} \quad \text{eq. (1)}$$

The Jacobian determinant of the VP for the measurable values (i.e., changes in B, F, and S over the area of the test sheet) with respect to contrast (C), foreground gray level ($G_F$) and background gray level ($G_B$), may be expressed as:

$$J_{VP} = \begin{vmatrix} \frac{\partial B}{\partial C} & \frac{\partial B}{\partial G_B} & \frac{\partial B}{\partial G_F} \\ \frac{\partial F}{\partial C} & \frac{\partial F}{\partial G_B} & \frac{\partial F}{\partial G_F} \\ \frac{\partial S}{\partial C} & \frac{\partial S}{\partial G_B} & \frac{\partial S}{\partial G_F} \end{vmatrix} = \frac{\partial(B, F, S)}{\partial(C, G_F, G_B)} \quad \text{eq. (2)}$$

Equation 2 allows for direct conversion of sensitivity in (B, F, S) space into sensitivity in (C, $G_F$, $G_B$) space. Using either (B, F, S) or (C, $G_F$, $G_B$) space, the instantaneous change in the void pantograph with respect to the Print-Scan (P, S) cycle may be expressed as $\partial VP/\partial PS$.

The sensitivity of (B, F, S) space to the print-scan process may be defined as:

$$VP_{after} = VP_{before} + \begin{vmatrix} \frac{\partial B}{\partial B} & \frac{\partial B}{\partial F} & \frac{\partial B}{\partial S} \\ \frac{\partial F}{\partial B} & \frac{\partial F}{\partial F} & \frac{\partial F}{\partial S} \\ \frac{\partial S}{\partial B} & \frac{\partial S}{\partial F} & \frac{\partial S}{\partial S} \end{vmatrix} * VP_{before} \quad \text{eq. (3)}$$

Equation 3 may be simplified as:

$$VP_{after} = VP_{before} + \begin{vmatrix} 1 & \frac{\partial B}{\partial F} & \frac{\partial B}{\partial S} \\ \frac{\partial F}{\partial B} & 1 & \frac{\partial F}{\partial S} \\ \frac{\partial S}{\partial B} & \frac{\partial S}{\partial F} & 1 \end{vmatrix} * VP_{before} \quad \text{eq. (4)}$$

By defining $A=\partial B/\partial F$, $B=\partial B/\partial S$, and $C=\partial F/\partial S$ equation 4 may be rewritten through substitution as:

$$VP_{after} = VP_{before} + \begin{vmatrix} 1 & A & b \\ 1/A & 1 & C \\ 1/B & 1/C & 1 \end{vmatrix} * VP_{before} \quad \text{eq. (5)}$$

by defining $$J_S = \begin{vmatrix} 1 & A & B \\ 1/A & 1 & C \\ 1/B & 1/C & 1 \end{vmatrix} \quad \text{eq. (6)}$$

Equation 6, through substitution may be expressed as:

$$VP_{after} = VP_{before} + J_S * VP_{before} \quad \text{eq. (7)}$$

Equation 7 may be rearranged to intermediate equation $VP_{after} = VP_{before}(I+J_S)$ and then as:

$$VP_{before} = (I+J_S)^{-1} * VP_{after} \quad \text{eq. (8)}$$

In vector form, $$\begin{bmatrix} B \\ F \\ S \end{bmatrix}_{before} = (I+J_S)^{-1} * \begin{bmatrix} B \\ F \\ S \end{bmatrix}_{after} \quad \text{eq. (9)}$$

The partial derivatives A, B, and C may be measured, step 650. As mentioned above with regard to equation 2, changes in B, F and S over the area of the test sheet can be measured by moving from one test "module" or "shape/background" to another. Movement from one test "module" to another represents a change in one or more of B, F and S with respect to another, and so readily generate the partial derivatives needed for the Jacobian.

At step 655, the change in the void pantograph may be predicted. This prediction may identify (step 660), before the print/scan cycle, the candidate void pantograph having optimal characteristics. The prediction may be made using the above equations (subject to the noise of measuring derivatives A, B and C (or their inverses), whichever is less noisy). Note that a proportionality term ($P_{JS}$) that may be necessary to multiply by the $J_S$ that is determined experimentally from the data along with the partial derivatives A, B and C (or their inverses). Proportionality term $P_{JS}$ represents how wide the range of potential candidate void settings may be on a page—e.g., area 24 of FIG. 3B.

Figure 7:
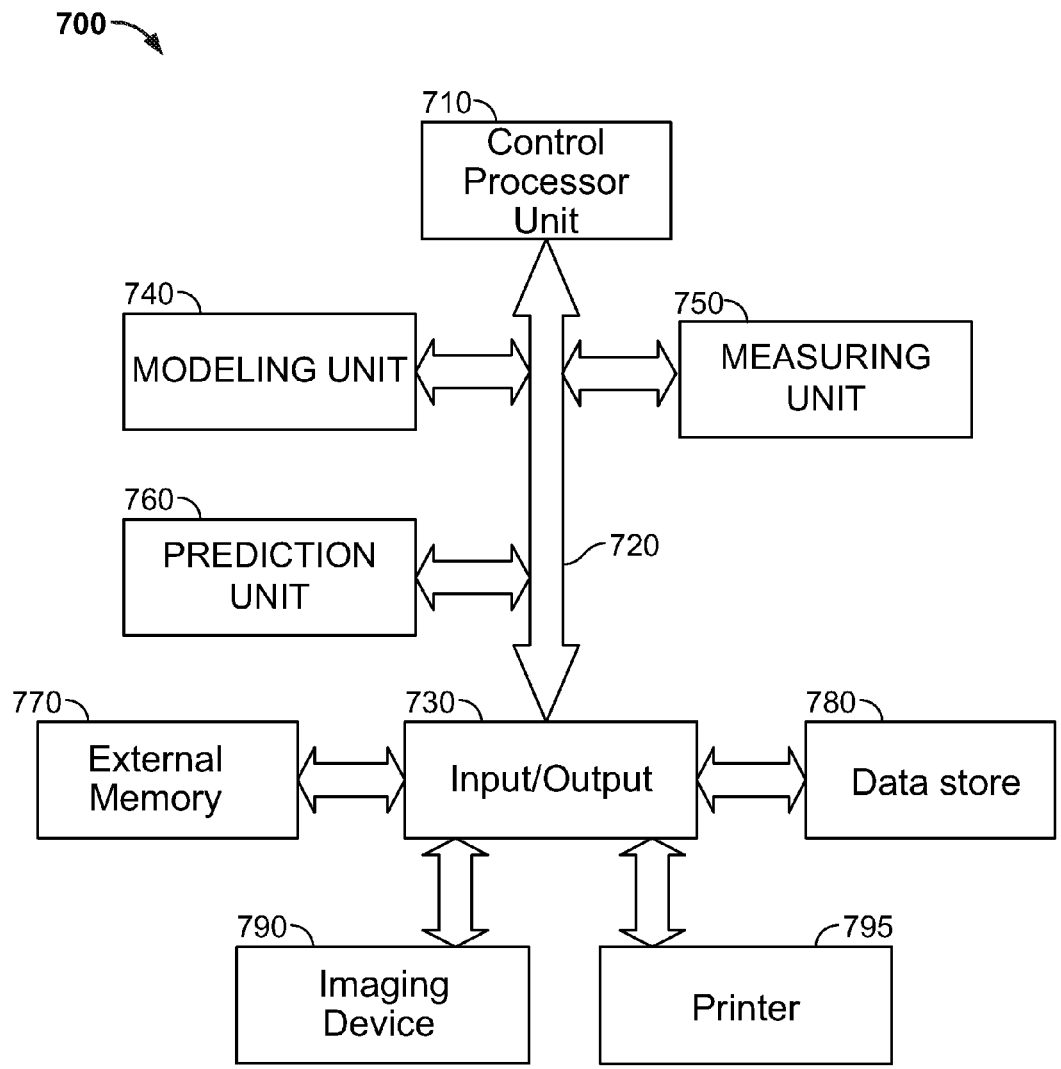
FIG. 7 depicts a schematic of a system in accordance with an embodiment of the invention.

FIG. 7 depicts a schematic of system 700 in accordance with an embodiment of the invention. System 700 may include a controller or central processor 710 that may be connected to an internal bus 720. The controller may be a processing unit, a field programmable gate array, discrete analog or digital circuitry, etc. Control processor 710 may access a computer application program stored in non-volatile memory internal to control processor 710 (not shown) or stored in external memory 770. External memory 770 may be connected to control processor 710 via input/output (I/O) port 730. The computer application program may cause control processor 710 to perform one or more of the above-described methods when executed.

System 700 may include modeling unit 740 that may model regions of candidate test sheets. The model may include three dimensions, e.g., percent background (B)—e.g., gray level coverage of the void pantograph highlight pattern; percent foreground (F)—e.g., gray level coverage of the void pantograph background pattern; and different shape representations (S). The model regions of the candidate test sheets may be used by prediction unit 760, described below.

The modeling unit may be implemented by dedicated hardware, software modules, and/or firmware, where control processor 710 executes the instructions. Other units discussed herein may also be implemented by dedicated hardware units, software modules, and/or firmware, where control processor 710 executes the instructions.

Measuring unit 750 may measure values of the test sheets with respect to contrast (C), foreground gray level ($G_F$) and background gray level ($G_B$). In accordance with an embodiment of the invention, measuring unit 750 may measure partial derivatives A, B, C (described above). The measuring unit may make these measurements by analyzing electronic data provided from non-xerographic imaging device 790 (e.g., a digital camera or inspection camera). The electronic data from the imaging device may be stored in external memory 770, data store 780, and/or provided to measuring unit 750 from the imaging device.

Prediction unit 760 may predict the magnitude of visual appearance change for one or more candidate void pantographs based on the test sheet models from modeling unit 740 in combination with the measurements from measuring unit 750. By predicting the magnitude of visual appearance change, system 700 may automatically determine a void pantograph with optimal characteristics without needing to go through a print/scan cycle.

System 700 may include data store 780 which may include a data base and/or data records. Data store 780 may contain information accessed by modeling unit 740, measuring unit 750, and/or prediction unit 760. For example, electronic images captured by imaging device 790, measurements of derivatives A, B, C made by measuring unit 750 and used by prediction unit 760, proportionality term ($P_{JS}$), etc.

Printer 795 may be used to print test sheets, candidate test sheets, scanned sheets, and documents with a multi-layer architecture. Printer 795 may include variable data printing techniques and technology. The one-use information for variable data printing may be stored in data store 780 accessible by control processor 710 and/or printer 795.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for automatic selection of void pantograph settings in accordance with an embodiment of the invention.

The computer-readable medium may be a non-transitory computer-readable media including all forms and types of memory and all computer-readable media except for a transitory, propagating signal. In one implementation, external memory 770 may be the non-volatile memory or computer-readable medium.

A method and/or system in accordance with an embodiment of the invention may provide a repeatable approach to void pantograph settings determination by reducing or eliminating human subjectivity in the visual perception of the void pantograph. The settings determination may be repeatable and reproducible via deterministic calculations. In one implementation, the above-described method and system may provide optimum void pantograph settings for fully variable printing, where each void pantograph can be unique in the world.

While there have been shown and described fundamental novel features of the invention as applied to one or more embodiments, it will be understood that various omissions, substitutions, and changes in the form, detail, and operation of these embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for determining void pantograph settings, the method comprising:
   obtaining electronic images of one or more predefined physical test sheets having a plurality of void pantograph settings printed thereon;
   modeling one or more regions of the electronic images of the predefined physical test sheets on which the void pantograph settings have been printed;
   predicting the sensitivity of the void pantograph settings to a print/scan process, the predicting being based at least in part on the one or more modeled regions of the electronic images of the predefined physical test sheets on which the void pantograph settings have been printed; and
   identifying characteristics for a candidate void pantograph setting from the predicted sensitivity of the void pantograph settings printed on the predefined physical test sheets of which the electronic images have been obtained.

2. The method of claim 1, further including creating the electronic images using an imaging device.

3. The method of claim 1, wherein the region models include at least one of percent background, percent foreground, and shape representations.

4. The method of claim 3, wherein the predicting step is further based on measureable values of the electronic images relating to changes between the percent background, percent foreground, and shape representations.

5. The method of claim 4, wherein the predicting step is further based on a Jacobian determinant proportionality term.

6. A non-transitory computer readable medium having stored thereon instructions which when executed by a processor cause the processor to perform the method of:
   obtaining electronic images of one or more predefined physical test sheets having a plurality of void pantograph settings printed thereon;
   modeling one or more regions of the electronic images of the predefined physical test sheets on which the void pantograph settings have been printed;
   predicting the sensitivity of the void pantograph settings to a print/scan process, the predicting being based at least in part on the one or more modeled regions of the electronic images of the predefined physical test sheets on which the void pantograph settings have been printed; and
   identifying characteristics for a candidate void pantograph setting from the predicted sensitivity of the void pantograph settings printed on the predefined physical test sheets of which the electronic images have been obtained.

7. The non-transitory computer readable medium of claim 6, further including instruction for creating the electronic images using an imaging device.

8. The non-transitory computer readable medium of claim 6, wherein the region models include at least one of percent background, percent foreground, and shape representations, further including instruction for the predicting step to be further based on measureable values of the electronic images relating to changes between the percent background, percent foreground, and shape representations.

9. The non-transitory computer readable medium of claim 8, further including instruction for the predicting step to be further based on a Jacobian determinant proportionality term.

10. A system for determining void pantograph settings, the system comprising:
   a controller connected to an internal bus;
   hardware, including a processor and a memory;
   a modeling unit implemented at least by the hardware, connected to the internal bus, and configured to model regions of obtained electronic images of one or more predefined physical test sheets having a plurality of void pantograph settings printed thereon;
   a measuring unit implemented at least by the hardware, connected to the internal bus, and configured to measure at least one of a contrast value, a foreground gray level value, and background gray level value of the electronic images;
   a prediction unit implemented at least by the hardware, connected to the internal bus, and configured to predict a visual appearance change in the void pantograph settings based on a sensitivity of the void pantograph settings to a print/scan process and based on the modeled regions of the electronic images of the predefined physical test sheets on which the void pantograph settings have been printed; and
   an identification unit implemented at least by the hardware, connected to the internal bus, and configured to identify characteristics for a candidate void pantograph setting from the predicted sensitivity of the void pantograph settings printed on the predefined physical test sheets of which the electronic images have been obtained.

11. The system of claim 10, wherein the region models include at least one of percent background, percent foreground, and shape representations.

12. The system of claim 11, the measuring unit further configured to measure changes between at least one of the percent background, the percent foreground, and the shape representations.

13. The system of claim 10, further including an imaging device configured to provide the electronic images.

14. The system of claim 10, further including a data store accessible by the modeling unit, the measuring unit, and the prediction unit.

15. The method of claim 1, wherein identifying the characteristics comprises identifying a first area of the image for a pantograph background pattern and a second area of the image for a pantograph highlight pattern,
   wherein the pantograph background pattern and the pantograph highlight pattern upon printing are at least visually semi-covert and visually indistinguishable, and upon photocopying are visible and visually distinguishable from one another.

* * * * *